Aug. 9, 1966  R. E. ROSS ET AL  3,265,488
BENDING MOLD WITH PERIPHERAL HEAT ABSORBER
Filed Dec. 6, 1962

INVENTORS
Robert E. Ross and
BY   Lee F. Johnson

Robbe & Swope
ATTORNEYS

United States Patent Office 3,265,488
Patented August 9, 1966

3,265,488
BENDING MOLD WITH PERIPHERAL HEAT ABSORBER
Robert E. Ross and Lee F. Johnson, Toledo, Ohio, assignors to Libbey-Owens-Ford Glass Company, Toledo, Ohio, a corporation of Ohio
Filed Dec. 6, 1962, Ser. No. 242,795
3 Claims. (Cl. 65—288)

The present invention relates generally to a new and improved apparatus for bending glass sheets or plates.

The invention is more particularly concerned with a bending mold for producing curved glass sheets, for use as automobile windshields or the like, the marginal edges of which sheets are under compressive stress rendering them more rugged in nature and better able to resist damage due to shock or impact.

As is well known, an inherent characteristic of glass is its capacity to physically respond to being heated and substantially cooled whereby internal stresses are developed within the glass body so treated. The particular stresses developed in the glass body are dependent upon the rate upon which this body is cooled from an elevated temperature. By controlling the rate of cooling, a process commonly referred to as annealing, the resulting stresses in the glass body may be controlled. Moreover, by initiating different phases of heating and cooling in different areas of the glass body, it is possible to develop localized areas of tension and compression within the glass body. Naturally, in the glass body as a whole, at normal temperatures, a condition of stability or equilibrium exists wherein tensional and compressive stresses are in balance.

The above-described characteristic of glass may be used to advantage in producing glass sheets having a predetermined pattern of localized stresses. In general, this is accomplished by heating the glass sheets to an elevated temperature above the annealing point of glass and controlling the rate of cooling of the glass through a range of decreasing temperatures commonly known as the annealing range. Those portions of the sheet which cool comparatively fast develop compressive stresses in the glass and, conversely, those portions which cool relatively slow develop tensional stresses. In this manner, the pattern of localized stresses may be controlled by controlling the rate of cooling of different areas of the sheet.

One type of apparatus adapted to produce glass sheets of the above character having a preselected pattern of localized stresses includes a bending mold having a substantially continuous shaping rail with shaping surfaces formed thereon to engage the marginal edge portions of the glass sheet and a metallic heat retaining member or strain bar spaced inwardly from the shaping rail and somewhat downwardly from the shaping surfaces. After the sheet is heated to the softening point of glass and sags into contact with the shaping surfaces, the mold is passed through an annealing zone of a bending furnace to cool the sheet in a controlled manner. During the bending process, the shaping rail and the strain bar absorb heat from the furnace and this residual heat retards the cooling of the areas of the glass sheet overlying these elements thereby causing these areas to set in tension and the intermediate area, which cools at the normal rate, to set in compression. The sheet is then cut to pattern outline through the intermediate areas to produce a finished sheet having its edges under compressive stress.

An important object of the invention is to provide, in a bending mold of the above character, a new and improved strain bar adapted to produce a clearly defined area of localized stresses well orientated to the pattern outline of the finished glass sheet.

Other objects and advantages of the invention will become more apparent during the course of the following description when taken in connection with the accompanying drawings.

In the drawings, wherein like numerals are employed to designate like parts throughout the same:

Figure 1:
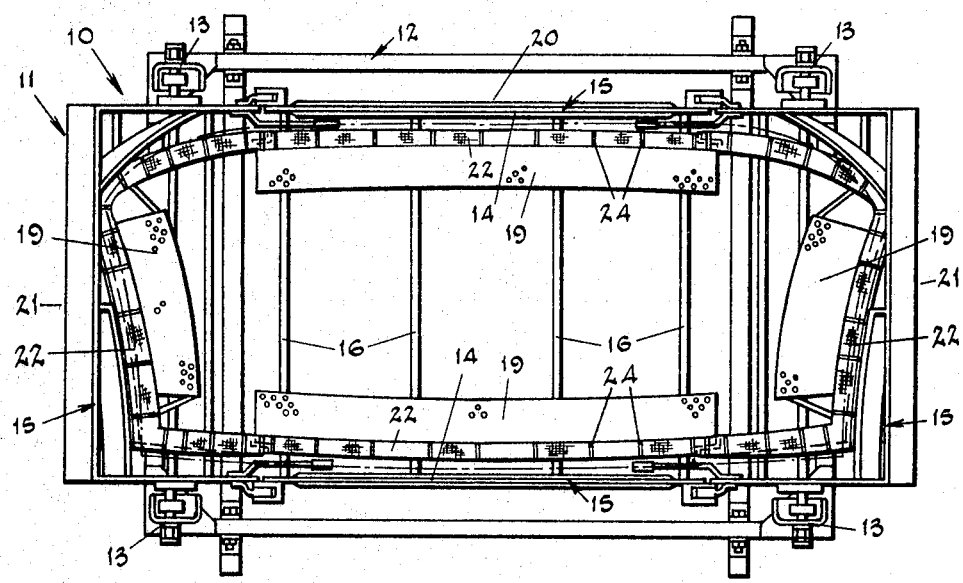
FIG. 1 is a plan view of a bending apparatus embodying the novel features of the present invention.

For purposes of illustration, the present invention is shown in the drawings embodied in an apparatus 10 for producing curved glass sheets for use as vehicle windshields or the like. In general, the apparatus 10 includes an outline or skeleton type bending mold 11 supported on a conventional rectangular rack 12 by support posts 13 upstanding from the rack on opposite sides of the mold. The outline type mold 11 is formed from relatively narrow shaping rails 14 arranged in a closed configuration conforming in outline to the marginal outline of a blank size glass sheet to be bent. Shaping surfaces 15 adapted to engage the marginal edge portions of the sheet and conforming, in elevation, to the desired curvature of the sheet when bent are formed on upwardly directed edges of the shaping rails 14. The shaping rails 14 are tied together to form a unitary, rigid structure by tie bars 16 spanning the mold and fixed at their opposite ends to the shaping rails.

To form the desired stress pattern in the finished sheet, a strain bar 17 contoured to the desired outline pattern of the finished sheet but somewhat smaller as compared thereto, is located within the confines of the shaping rails 14 and below the shaping surfaces 15 formed thereon. The strain bar 17 is mounted on posts 18 upstanding from the tie bars 16 extending between the shaping rails. As set forth above, the shaping rails 14 and the strain bar 17 both function to retard cooling of the areas of the sheet thereabove during the annealing process thus creating spaced bands of tensional stress and an intermediate band of compressive stress in the glass sheet through which intermediate band the sheet is subsequently trimmed along a cut-line L to the final pattern outline.

In order to better control the stress pattern of the glass sheet in areas located inwardly of the strain bar 17, various shields 19 are carried by the strain bar to alter the heating and cooling of the areas of the sheet overlying the shields.

The particular mold 11 illustrated in FIG. 1 is of the so-called sectionalized type adapted to bend the sheets to relatively complex curvatures. To this end, the shaping rails 14 and the strain bar 17 are divided into a center section 20 and two oppositely disposed end sections 21 positioned end to end to form a substantially continuous structure. The adjacent ends of the shaping rails are hingedly joined together to permit relative movement between the sections.

Since, as noted above, considering the sheet as a whole at normal temperatures, the tensional and compressive stresses in a glass sheet are in balance, the magnitude of the compressive stresses are dependent upon the magnitude of the tensional stresses created in the sheet by the shaping rails 14 and the strain bar 17. The magnitude of the tensional stresses created in the area of the sheet overlying the strain bar 17 is, in turn, dependent upon the efficiency with which the strain bar can retard the cooling of this area. To maintain the strain bar 17 at an elevated temperature for longer periods of time, strips of insulating material 22 such as asbestos, glass cloth or the like are attached to the upper surface of the bar to reduce the rate of transfer of heat from the bar to the sheet.

The relative positions of the bands of compressive and tensional stresses is governed by both the mass of the shaping rails and the strain bar, which controls the heat absorbing and retaining characteristics of these elements, and the spacing between the elements. The magnitude of the compressive stress in the area of the sheet between the strain bar 17 and the shaping rails 14 is greatest immediately adjacent the bands of tensional stress created by these elements and decreases progressively away from these bands.

It has been discovered that the magnitude of the compressive stresses created by the strain bar varies in different areas of the sheet when the relative spacing between the strain bar and the shaping rails remain constant. The exact cause of this phenomenon is unknown; however, the variance is believed to be the result of a difference in the effect of the strain bar on various areas of the sheets. The difference in effect is, perhaps, caused by differences in the positional and angular relationship between the strain bar and the bent sheet of glass resting on the mold during the annealing process at different locations along the mold. In any event, it has been found that at times the area of the sheets at the cut-line L at the end of the sheet is not under the desired compressive stress or, at least, is not under compressive stress of sufficient magnitude to render the edges of the finished pattern-cut sheet resistant to damage due to shock or impact.

To overcome this difficulty, the present invention contemplates a strain bar constructed in a novel manner to enable varying the spacing between the strain bar and the shaping rail and thereby varying the positional relationship between the strain bar and the cut-line L on the glass sheet. To this end, the strain bar is provided with a member 23 fixed thereto and extending outwardly of the strain bar toward the cut-line L on the glass sheet.

In the present instance, the member 23 comprises a foraminous metallic plate which absorbs and retains a small amount of heat as compared to the strain bar 17 thus enabling the plate to extend relatively close to the cut-line L without creating a tensional stress in the area of the sheet at the cut-line. As a result, the strain bar 17 and the member 23 act together to create a relatively wide band of tensional stress extending adjacent to but terminating short of the cut-line L of the sheet thereby insuring that the area of the sheet at the cut-line will be under the desired compressive stress.

Figure 3:
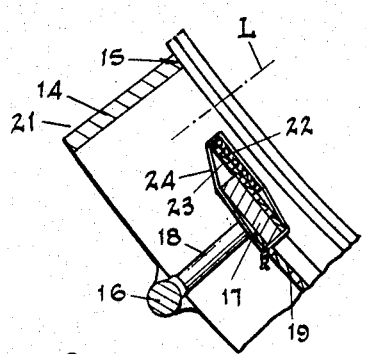
FIG. 3 is a fragmentary sectional view showing a strain bar constructed in accordance with the present invention.
Figure 2:
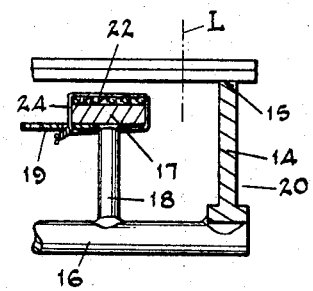
FIG. 2 is a fragmentary sectional view showing a strain bar constructed in the conventional manner.

The member 23 rests on the upper surface of the strain bar 17 and is releasably attached thereto enabling shifting of the member to move its outer edge toward or away from the adjacent shaping rail 14. As shown in FIG. 3, the means attaching the member 23 to the bar 17, in the present instance, comprises a wire 24 extending around the member and the bar. Preferably, the wire 24 is also utilized to secure the strips of insulating material 22 to the strain bar 17.

It will be appreciated that the members 23 may be simply attached to the bar 17 at locations where it is determined that the sheet is not under compressive stress of the desired magnitude a the cut-line L. Moreover, the relative location of the member 23 and the cut-line L may be easily adjusted to obtain optimum results without materially reworking or redesigning the bending mold.

It is to be understood that the form of the invention herewith shown and described is to be taken as a preferred embodiment of the same, and that various changes in the shape, size and arrangement of parts may be resorted to without departing from the spirit of the invention.

We claim:
1. In apparatus for bending glass sheets, the combination of, an outline type bending mold having a substantially continuous shaping surface formed thereon and conforming in outline to a blank-size glass sheet when bent, a substantially continuous strain bar carried by said mold within the confines of said shaping surface in spaced relationship therewith, and a plate carried by said strain bar and extending outwardly therefrom toward the shaping surface, said plate having relatively smaller mass than said bar whereby the stresses imparted by said strain bar and said plate decrease in magnitude in the direction of said shaping surface.

2. In apparatus for bending glass sheets as defined in claim 1, means for releasably attaching said plate to said strain bar to permit the plate to be selectively shifted relative to said bar.

3. In apparatus for bending glass sheets as defined in claim 1, insulating material carried by and covering portions of said bar and said plate.

References Cited by the Examiner

UNITED STATES PATENTS

| 2,729,032 | 1/1956 | White | 65—374 X |
| 3,069,877 | 12/1962 | Golightly | 65—103 |

FOREIGN PATENTS 230,615  10/1960  Australia.

DONALL H. SYLVESTER, *Primary Examiner.*

A. D. KELLOGG, *Assistant Examiner.*